United States Patent
Li et al.

(10) Patent No.: US 12,554,525 B2
(45) Date of Patent: Feb. 17, 2026

(54) ACCESS METHOD OF STORAGE DEVICE AND VIRTUAL DEVICE

(71) Applicant: SAMSUNG ELECTRONICS CO., LTD., Suwon-si (KR)

(72) Inventors: Peiwei Li, Suwon-si (KR); Gaofei Lv, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 459 days.

(21) Appl. No.: 18/107,034

(22) Filed: Feb. 8, 2023

(65) Prior Publication Data

US 2024/0160462 A1 May 16, 2024

(30) Foreign Application Priority Data

Nov. 11, 2022 (CN) .......................... 202211414675.1

(51) Int. Cl.
*G06F 9/455* (2018.01)

(52) U.S. Cl.
CPC .................... *G06F 9/45558* (2013.01); *G06F 2009/45579* (2013.01)

(58) Field of Classification Search
CPC ....... G06F 9/45558; G06F 2009/45579; G06F 3/0659; G06F 3/0679; G06F 3/0688; G06F 3/0611; G06F 2212/1016
See application file for complete search history.

(56) References Cited

U.S. PATENT DOCUMENTS 8,543,754 B2   9/2013   Glass et al.
9,459,908 B2   10/2016  Anand et al.
(Continued)

FOREIGN PATENT DOCUMENTS

CN    104125166 A    10/2014
CN    112328519 A     2/2021
CN    114138422       3/2022

OTHER PUBLICATIONS

Extended European Search Report in European Appln No. 23155550.9, mailed on Aug. 21, 2023, 11 pages.
(Continued)

*Primary Examiner* — Dong U Kim
(74) *Attorney, Agent, or Firm* — Fish & Richardson P.C.

(57) ABSTRACT

An access method of a storage device and a virtual device are provided. The storage device supports a single root input output virtualization (SR-IOV), the storage device is virtualized as at least two virtual functions (VFs), the access method comprises: in response to an input/output (I/O) request for the storage device by an application, transmitting the I/O request to a corresponding VF by a virtual machine, the VF writing a completion message of the I/O request to a completion queue (CQ); querying the CQ in a polling manner by a processor of the virtual machine; and if there is the completion message of the I/O request in the CQ, returning the completion message to the application by the virtual machine. Since the storage virtualization system processes I/O requests in a polling manner, this manner avoids the delay and overhead caused by the interruption, and enables the application to improve I/O efficiency, and finally enables the random parallel read and write performance of the virtual machine using SR-IOV technology to allocate high-speed SSDs, to be improved significantly.

11 Claims, 14 Drawing Sheets

(56) References Cited

U.S. PATENT DOCUMENTS

| | | |
|---|---|---|
| 9,910,689 B2 | 3/2018 | Nair |
| 10,579,275 B2 | 3/2020 | Araki et al. |
| 11,093,175 B1* | 8/2021 | Kotzur .................. G06F 3/0659 |
| 2018/0278539 A1* | 9/2018 | Shalev .................. H04L 69/326 |
| 2021/0247935 A1* | 8/2021 | Beygi ..................... G06F 3/061 |
| 2021/0397547 A1* | 12/2021 | Li ....................... G06F 9/45558 |

OTHER PUBLICATIONS

Peng et al., "MDev_NVMe: A NVMe Storage Virtualization Solution with Mediated Pass-Through," USENIX Annual Technical Conference, 2018, 665-676.

* cited by examiner

ACCESS METHOD OF STORAGE DEVICE AND VIRTUAL DEVICE

CROSS-REFERENCE TO RELATED APPLICATION

This application is based on and claims priority to Chinese Patent Application No. 202211414675.1, filed on Nov. 11, 2022 in the Chinese Patent Office, the contents of which being herein incorporated by reference in its entirety.

TECHNICAL FIELD

The present disclosure relates to input-output (I/O) virtualization technology, and more particularly, to a storage virtualization system, a method and apparatus for controlling the storage virtualization system, and a memory access method for the storage virtualization system.

BACKGROUND ART

In the field of virtualization technology, both central processing unit (CPU) virtualization and memory virtualization have matured. With the advancement of technology, the performance overhead associated with the CPU virtualization and the memory virtualization is largely negligible, and research efforts are mainly focused on reducing I/O virtualization overhead.

SUMMARY

An object of the present invention is to provide a storage virtualization system capable of improving input-output (I/O) efficiency, a method and device for controlling the storage virtualization system, and a memory access method for the storage virtualization system.

According to one aspect of the present disclosure, an access method of a storage device, the storage device supporting a single root input output virtualization (SR-IOV), the storage device is virtualized as at least two virtual functions (VFs), the access method comprising: in response to an input/output (I/O) request for the storage device by an application, transmitting the I/O request to a corresponding VF by a virtual machine, the VF writing a completion message of the I/O request to a completion queue (CQ); querying the CQ in a polling manner by a processor of the virtual machine; and if there is the completion message of the I/O request in the CQ, returning the completion message to the application by the virtual machine.

Alternatively, the querying of the CQ in a polling manner by a processor of the virtual machine comprising: after an I/O request control right of the processor is acquired by the virtual machine, the processor of the virtual machine queries the CQ in the polling manner.

Alternatively, the virtual machine executes the access method through a storage device driver of the virtual machine.

Alternatively, the I/O request is an I/O read request or an I/O write request.

According to one respect of the present disclosure, a virtual device, the virtual device supporting a single root input output virtualization (SR-IOV), the virtual device comprising: at least two virtual functions (VFs) configured to process input/output (I/O) requests and to write a completion message of the I/O request to a completion queue (CQ); and a processor configured to: in response to the I/O request for a corresponding VF by an application, transmit the I/O request to the corresponding VF; query the CQ in a polling manner; and if there is the completion message of the I/O request in the CQ, return the completion message to the application.

Alternatively, the processor is configured to: after an I/O request control right of the processor is acquired by the virtual machine, query the CQ in the polling manner.

Alternatively, the virtual device further comprises: a storage device driver configured to control the at least two VFs and the processor.

Alternatively, the I/O request is an I/O read request or an I/O write request.

According to one aspect of the present disclosure, a computer-readable storage medium storing a computer program, that, when executed by a processor, implements the above-described access method of the storage device.

According to one aspect of the present disclosure, an electronic device, comprising: a processor; and a memory configured to store a computer program, that, when executed by a processor, implements the above-described access method of the storage device.

According to one aspect of the present disclosure, a storage system, comprising: a storage device configured to support a single root input output virtualization (SR-IOV) and be virtualized as at least two virtual functions (VFs); and a memory controller configured to access the storage device according to the above-described access method of the storage device.

According to one aspect of the present disclosure, a storage system comprising: a memory device configured to support a single root input output virtualization (SR-IOV) and be virtualized as at least two virtual functions (VFs); and a memory controller communicating with the memory device through a channel and configured to access the memory device according to the above-described access method of the storage device.

According to one aspect of the present disclosure, a host storage system, comprising: a host; and a storage device configured to support a single root input output virtualization (SR-IOV) and be virtualized as at least two virtual functions (VFs), wherein the host is configured to access the memory device according to the above-described access method of the storage device.

According to one aspect of the present disclosure, a data center comprising: an application server; and a storage server configured to communicate with the application server over a network, support a single root input output virtualization (SR-IOV) and be virtualized as at least two virtual functions (VFs), wherein the application server is configured to access the memory device according to the above-described access method of the storage device.

In the present disclosure, since the storage virtualization system processes I/O requests in a polling manner, this manner avoids the delay and overhead caused by an interruption, and enables the application to improve I/O efficiency, and finally enables the random parallel read and write performance of the virtual machine using SR-IOV technology to allocate high-speed SSDs, to be improved significantly.

BRIEF DESCRIPTION OF THE DRAWINGS

The above and other aspects of the present disclosure will become apparent and more easily understood by the following detailed description in conjunction with the accompanying drawings.

Figure 1:
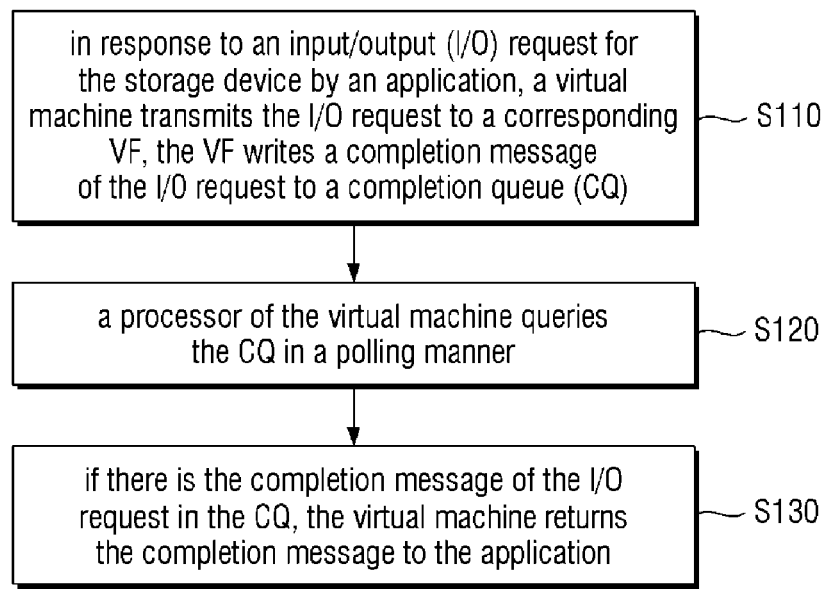
FIG. 1 is a flowchart illustrating a memory access method of a storage virtualization system according to an exemplary embodiment.

Throughout the drawings and the detailed description, the same figure reference numerals will be understood to refer to the same elements, features and structures. The drawings may not be to scale, and the relative size, proportions, and depiction of elements in the drawings may be exaggerated for clarity, ease of illustration, and convenience.

DETAILED DESCRIPTION OF THEY INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening there-between. In contrast, when an element is described as being "directly connected to," or "directly coupled to" another element, there can be no other elements intervening there-between. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various elements, components, regions, layers, or sections, these elements, components, regions, layers, or sections are not to be limited by these terms. Rather, these terms are only used to distinguish one element, component, region, layer, or section from another element, component, region, layer, or section. Thus, a first element, component, region, layer, or section referred to in examples described herein may also be referred to as a second element, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, elements, operations, members, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of skill in the art to which this disclosure pertains and is based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Hereinafter, embodiments of the present disclosure will be described in detail with reference to the accompanying drawings.

Figure 2:
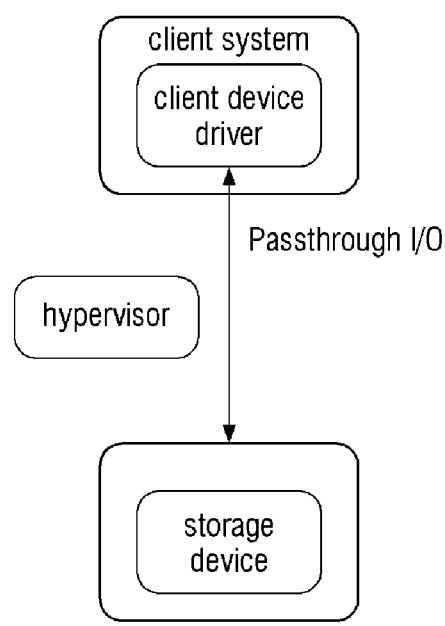
FIG. 2 is a flowchart illustrating that a storage virtualization system uses a Pass-Through function to perform an input/output (I/O) operation according to an exemplary embodiment.
Figure 3:
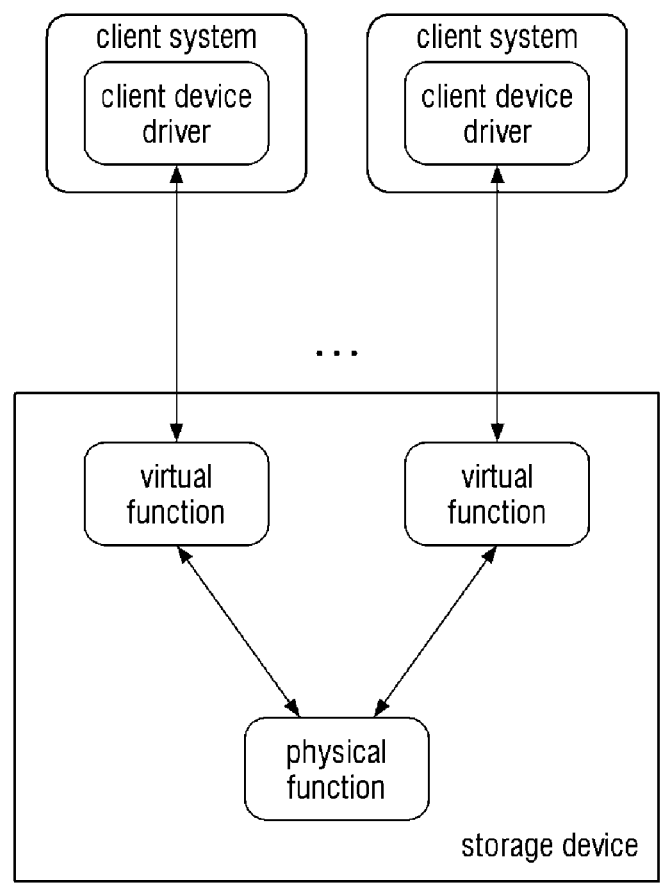
FIG. 3 is a block diagram illustrating a single root input output virtualization (SR-IOV) technique according to an exemplary embodiment.
Figure 4:
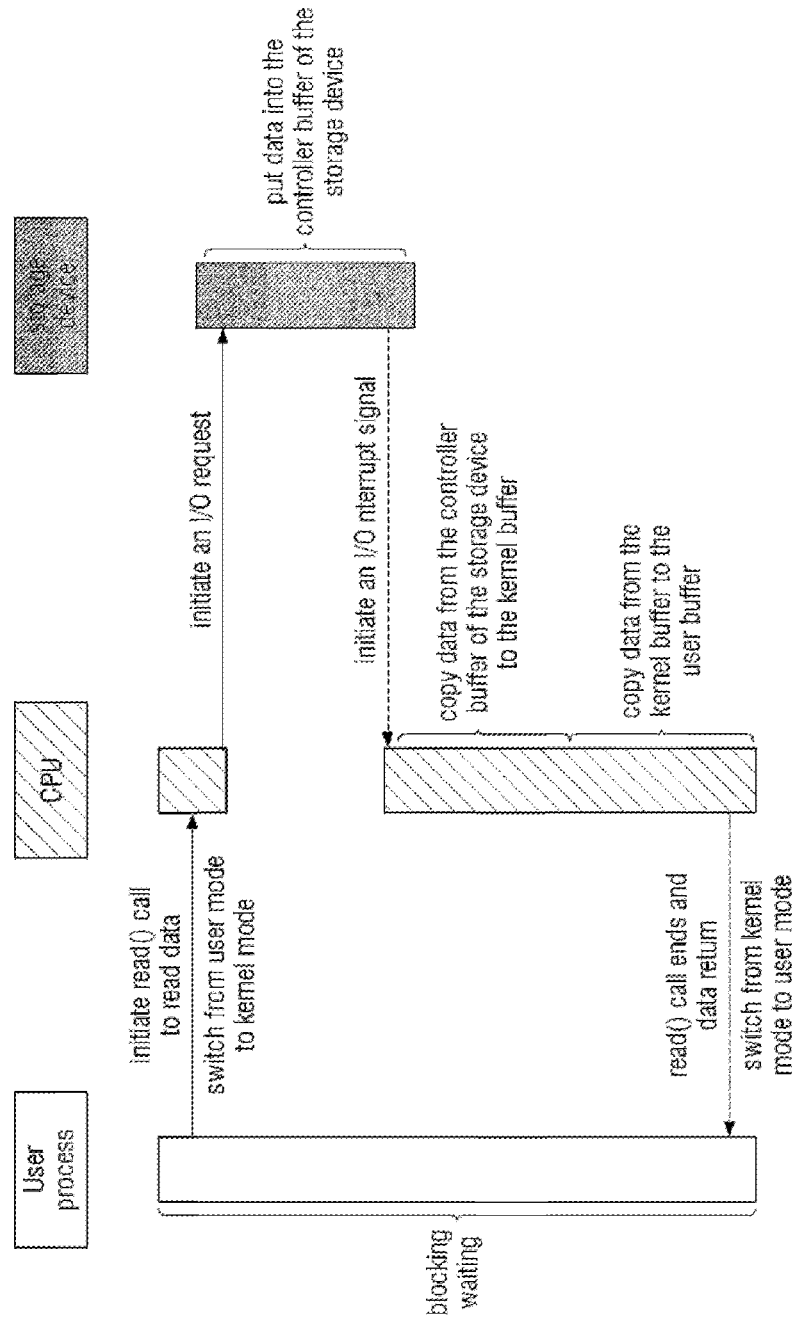
FIG. 4 is a flowchart illustrating that the storage virtualization system performs I/O operations using an interrupt manner.
Figure 5:
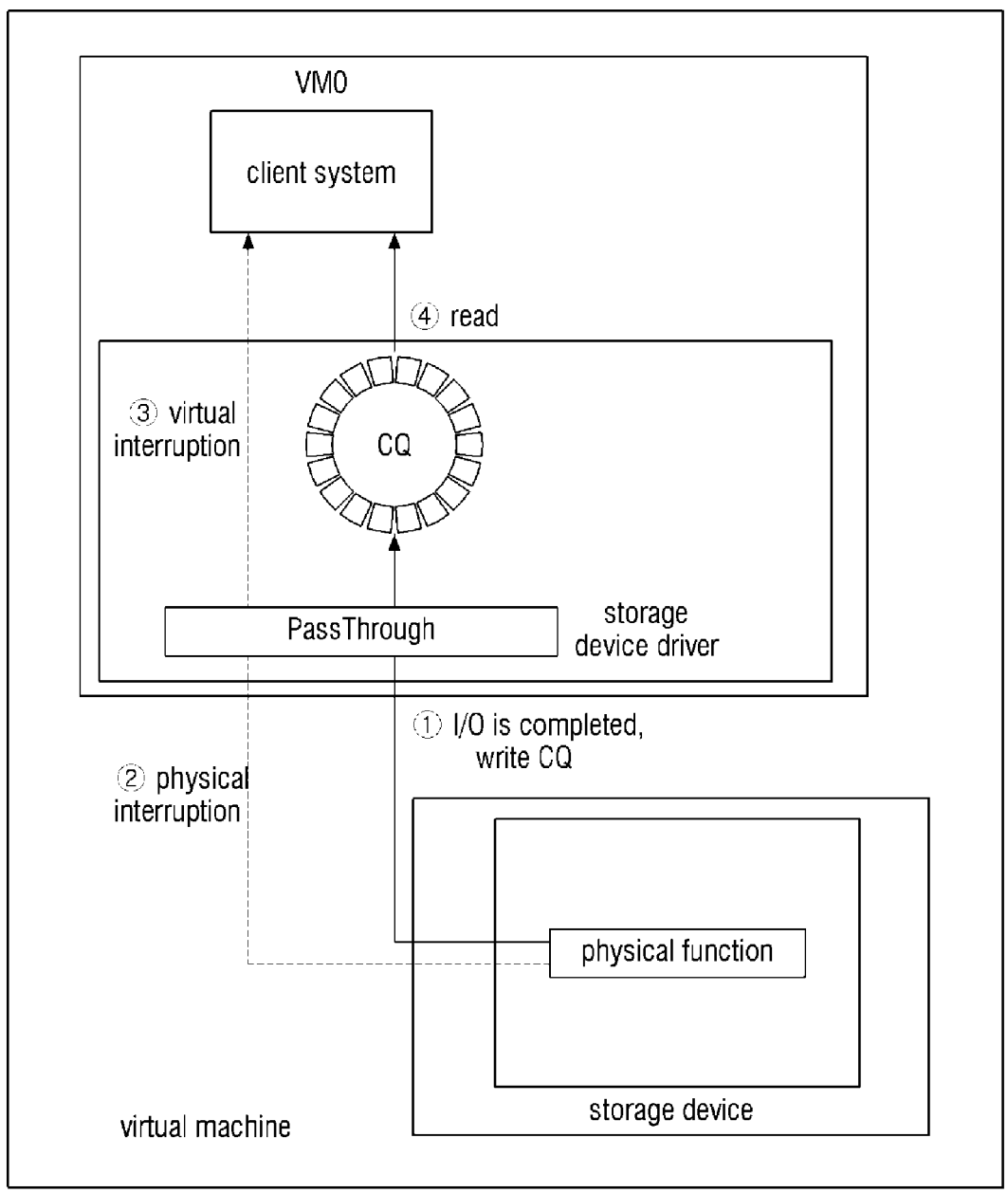
FIG. 5 is a flowchart illustrating that the storage virtualization system performs I/O operations using an interrupt manner.
Figure 6:
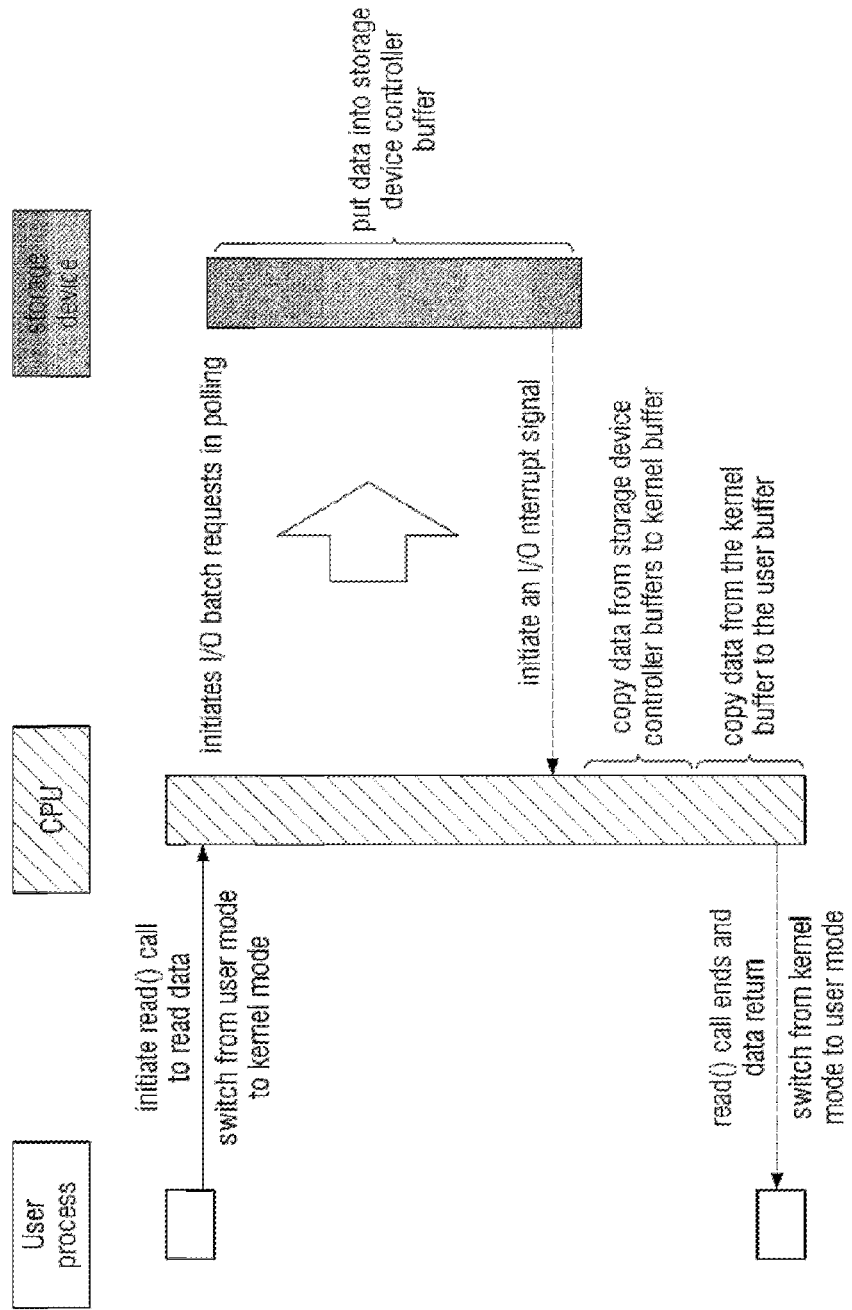
FIG. 6 is a flowchart illustrating that the storage virtualization system performs I/O operations using the polling manner, according to an exemplary embodiment.
Figure 7:
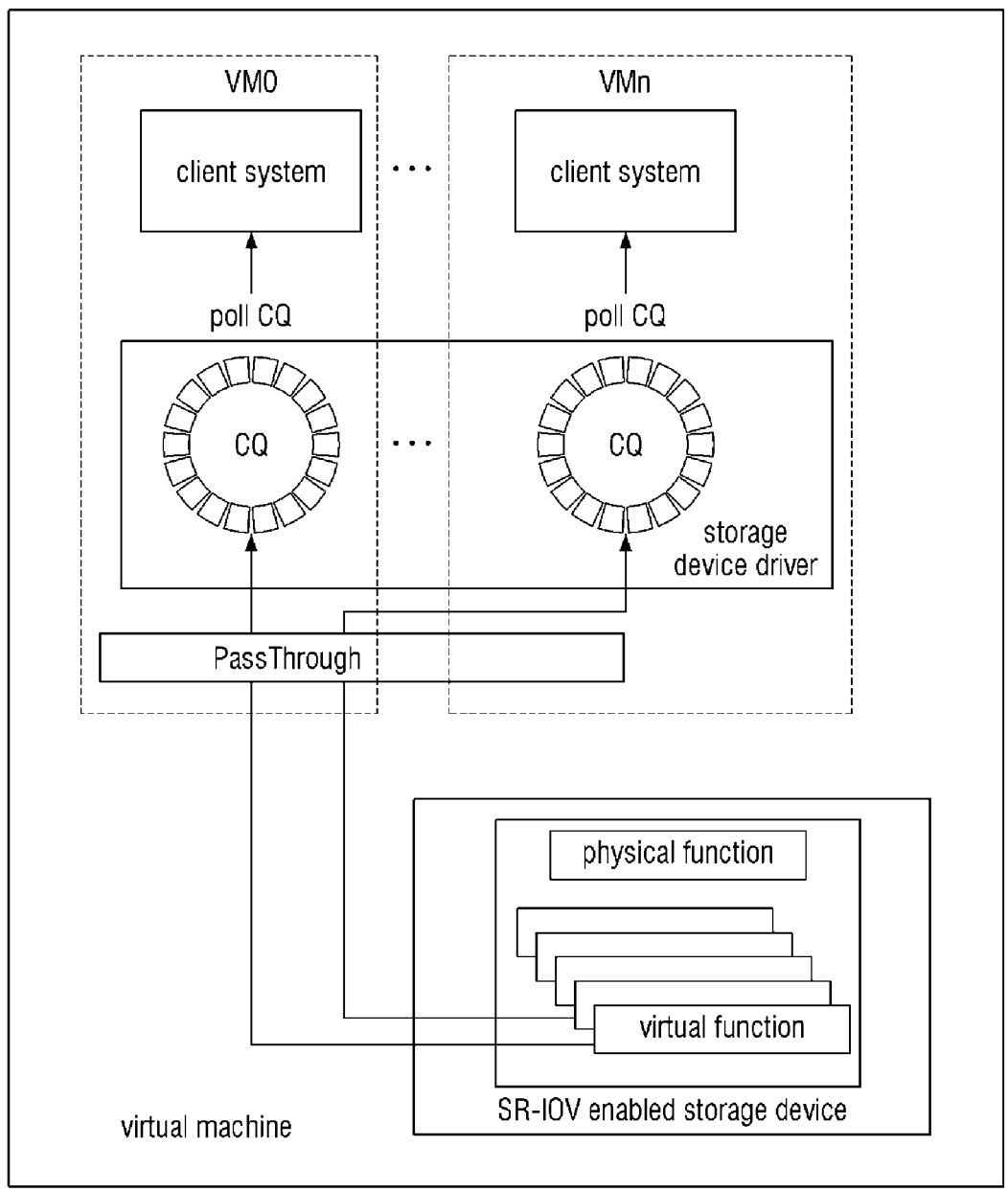
FIG. 7 is a flowchart illustrating that the storage virtualization system performs I/O operations using the polling manner, according to an exemplary embodiment.
Figure 8:
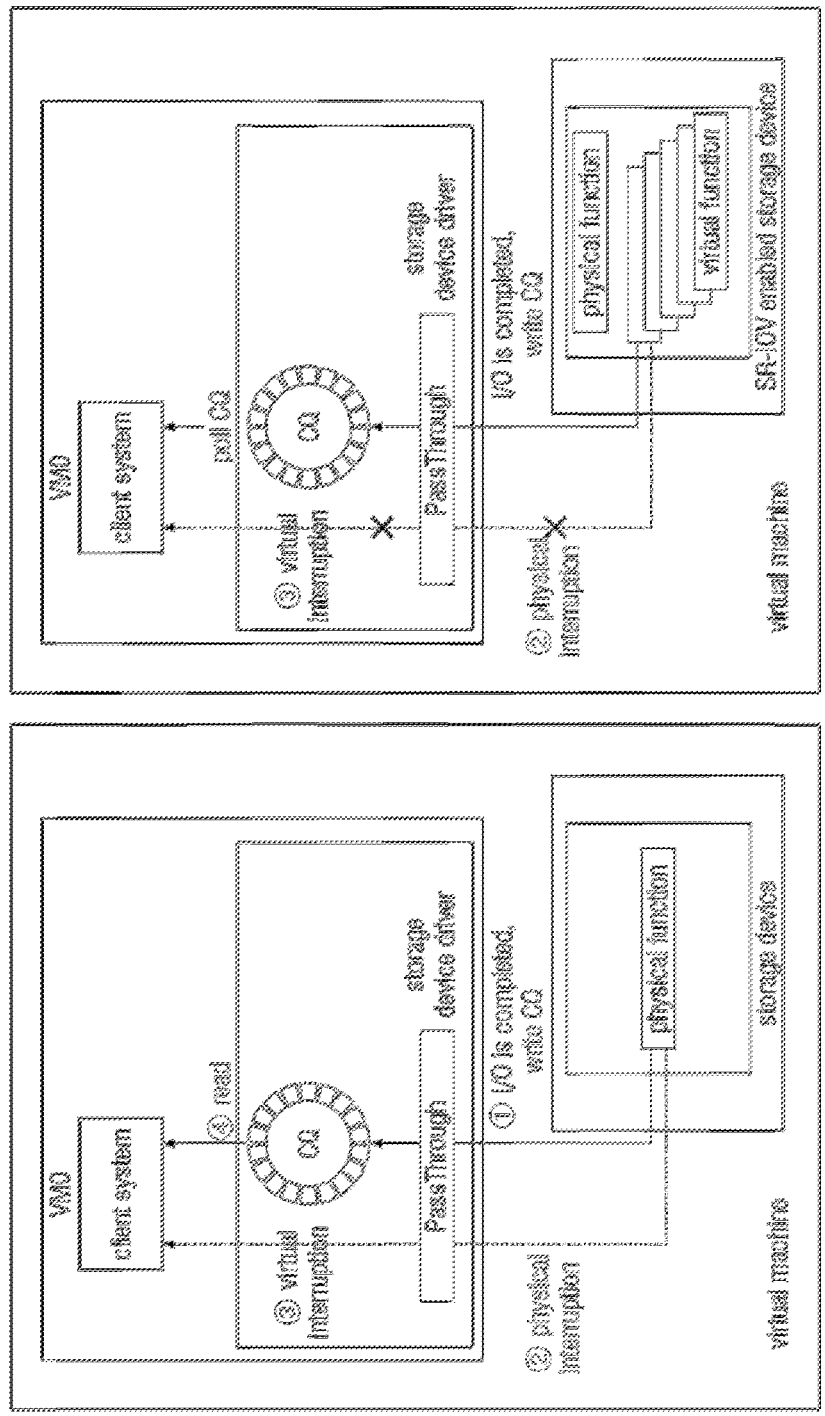
FIG. 8 is a comparison diagram illustrating the storage virtualization system performs I/O operations using the interrupt manner and performs I/O operations using the polling manner.

FIG. 1 is a flowchart illustrating a memory access method of a storage virtualization system according to an exemplary embodiment. FIG. 2 is a flowchart illustrating a storage virtualization system that uses a Pass-Through function to perform an input/output (I/O) operation according to an exemplary embodiment. FIG. 3 is a block diagram illustrating a single root input output virtualization (SR-IOV) technique according to an exemplary embodiment. FIG. 4 is a flowchart illustrating that the storage virtualization system performs I/O operations using an interrupt manner. FIG. 5 is a flowchart illustrating that the storage virtualization system performs I/O operations using an interrupt manner. FIG. 6 is a flowchart illustrating that the storage virtualization system performs I/O operations using the polling manner, according to an exemplary embodiment. FIG. 7 is a flowchart illustrating that the storage virtualization system performs I/O operations using the polling manner, according to an exemplary embodiment. FIG. 8 is a comparison diagram illustrating that a storage virtualization system performs I/O operations using the interrupt manner and performs I/O operations using the polling manner.

Referring to the flowchart illustrating a memory access method of a storage virtualization system according to an exemplary embodiment shown in FIG. 1, in step S110, in response to an I/O request for the storage device by an application, a virtual machine transmits the I/O request to a corresponding VF writing a completion message of the I/O request to a completion queue (CQ).

According to an exemplary embodiment of the present disclosure, the application may be an application running in a virtual machine. During the running of the application, the virtual machine may control the application to perform operations corresponding to the I/O request. In addition, the I/O request may be an I/O read request or an I/O write request.

According to an exemplary embodiment of the present disclosure, the Pass-Through function and SR-IOV of the storage device may be enabled. For example, referring to FIG. 2, the Pass-Through function can reduce the participation (or participation proportion) of the hypervisor in the I/O operation between the virtual machine and a corresponding hardware (for example, the storage device (for example, solid-state drives (SSD))) in the I/O operations by allowing the virtual machine to operate directly with corresponding hardware (e.g., storage devices (e.g., SSDs)) Participation (or participation weight) of I/O operations between virtual machines and corresponding hardware (e.g., storage devices (e.g., SSDs)), which enables storage virtualization systems associated with Pass-Through-enabled SSDs to achieve I/O performance comparable to the host side. However, in some cases, the advantages of the Pass-Through function will also be limited. For example, the advantages brought by the Pass-Through function are mainly aimed at machines with rich physical resources (such as SSD devices, Peripheral Component Interconnect Express (PCIe) slots, etc.), since this approach requires one physical resource to be allocated to one virtual machine. Once one physical resource has been occupied by one virtual machine, other virtual machines cannot use this physical resource.

This problem can be solved by enabling SR-IOV while enabling Pass-Through. SR-IOV enables one physical resource to be shared by multiple virtual machines (e.g., virtual machine VM0 to virtual machine VMn, where n is a positive integer). The SR-IOV standard, published by the Peripheral Component Interconnect Special Interest Group (PCI-SIG), specifies how a physical PCIe device (called as a physical function or PF) presents multiple virtual devices (called virtual functions or VFs) to the host. As shown in FIG. 3, according to this standard, a single PCIe device can expose, to an upper-layer virtual machine, multiple separate virtual devices (i.e., multiple VFs (e.g., VF1 to VFn)), each of which can be assigned to one virtual machine.

However, although the storage device eliminates the extra overhead caused by intervention of a virtual machine manager (VMM) during the I/O of the virtual machine by enabling Pass-Through and SR-IOV, the I/O device will generate a large number of interrupts in order to process I/O operations, in a case where the traditional virtual machine accesses a device using an interruption manner.

As an example, as the traditional I/O read request processing flow shown in FIG. 4, when a user process initiates a read request, the processor falls into the kernel state, sends an I/O request to the storage device, and then the processor enters a sleep state or waiting state, or switches to handle other user processes. In response to the I/O request, the storage device reads the data of the I/O request into a controller buffer of the storage device, and then sends an I/O interrupt signal to the processor, in response to receiving an interrupt signal, the processor switches the user process corresponding to the I/O request again, copies the read data from the controller buffer of the storage device to a kernel buffer, then copies the data from the kernel buffer to a user buffer, and finally returns data to the user process. As an example, the I/O interrupt overhead process based on the storage virtualization system as shown in FIG. 5, after the storage device reads the data of the JO request into the controller buffer of the storage device, a completion message is written in the completion queue CQ, and a physical interrupt is then issued to the CPU. After receiving the physical interrupt, the virtual machine converts the physical interrupt into a virtual interrupt through the Pass-Through technology and sends it to the corresponding virtual machine. In response to receiving the virtual interrupt, the processor switches to the user process corresponding to the I/O request.

As mentioned above, in the era of mechanical hard disks, the interrupt overhead accounted for only a small percentage of the total I/O time, however, with the continuous introduction of lower-latency persistent storage devices, the interrupt overhead became a part that cannot be ignored in the total I/O time, this problem will only get worse on devices with lower latency. In addition, when there is only one virtual machine, SR-IOV can achieve I/O performance comparable to the host performance (for example, random read and write performance), but as the number of parallel virtual machines increases, the impact of interrupt overhead will greatly affect random read and write performance.

In view of the above problems, as shown in FIGS. 6 to 8, the storage virtualization system according to an exemplary embodiment of the present disclosure can avoid latency and overhead due to a large number of interruptions in I/O operations by replacing the traditional interruption manner with a polling manner.

Therefore, in step S120, the processor of the virtual machine queries the CQ in a polling manner.

The polling manner works differently than the interrupt manner, in the polling manner, the processor checks at certain time intervals whether an I/O request has been completed, rather than switching to other user processes or switching to the sleep state, etc. like the interrupt manner. In order to implement the above-mentioned working manner of the polling, the processor of the virtual machine queries the CQ in the polling manner after the virtual machine acquires the control right of the I/O request of the processor.

Referring back to FIG. 1, in step S130, if there is the completion message of the I/O request in the CQ, the virtual machine returns the completion message to the application.

As described above, after the I/O request is transmitted to the storage device, the processor of the virtual machine may determine whether the processing of the I/O request is completed. For example, the processor of the virtual machine may poll at certain time intervals to check whether there is completion information for the I/O request in the completion queue. Additionally, the processor of the virtual machine may selectively notify the application of a completion message based on the result of the check. For example, the processor of the virtual machine may provide a completion message to the application in response to determining that the completion information described above is present in the completion queue. In one example, the virtual machine may execute the access method described above through the storage device driver of the virtual machine. For example, the steps S110 to S130 may be executed by the storage device driver of the virtual machine.

Since the notification about the completion of the I/O request by the storage device is not implemented by the storage device initiating an interrupt signal as in the traditional way, but by the application program issuing a query request at regular intervals as in the present disclosure, this manner avoids the delay and overhead caused by an interruption, and enables the application to improve I/O efficiency, and finally enables the random parallel read and write performance of the virtual machine using SR-IOV technology to allocate high-speed SSDs to be improved significantly.

Figure 9:
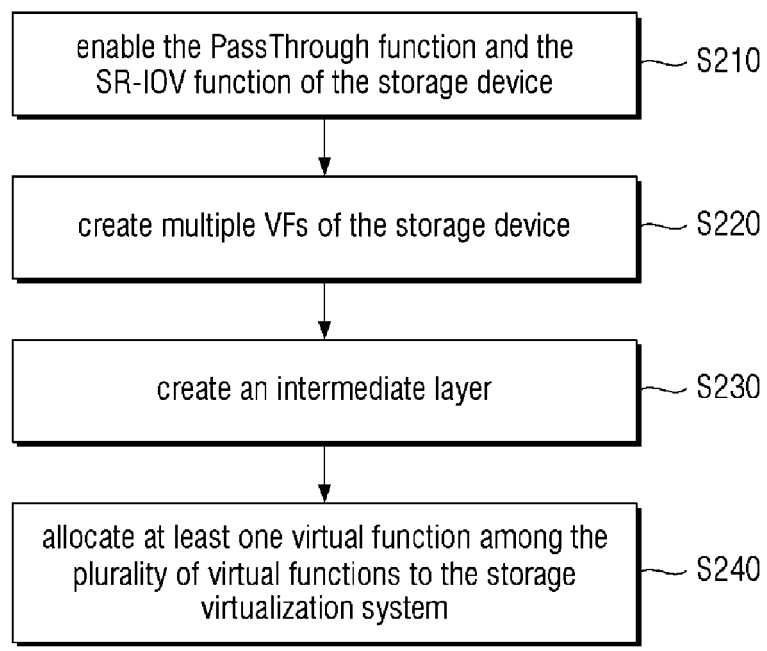
FIG. 9 is a flowchart of a method of establishing a virtual machine according to an exemplary embodiment.
Figure 10:
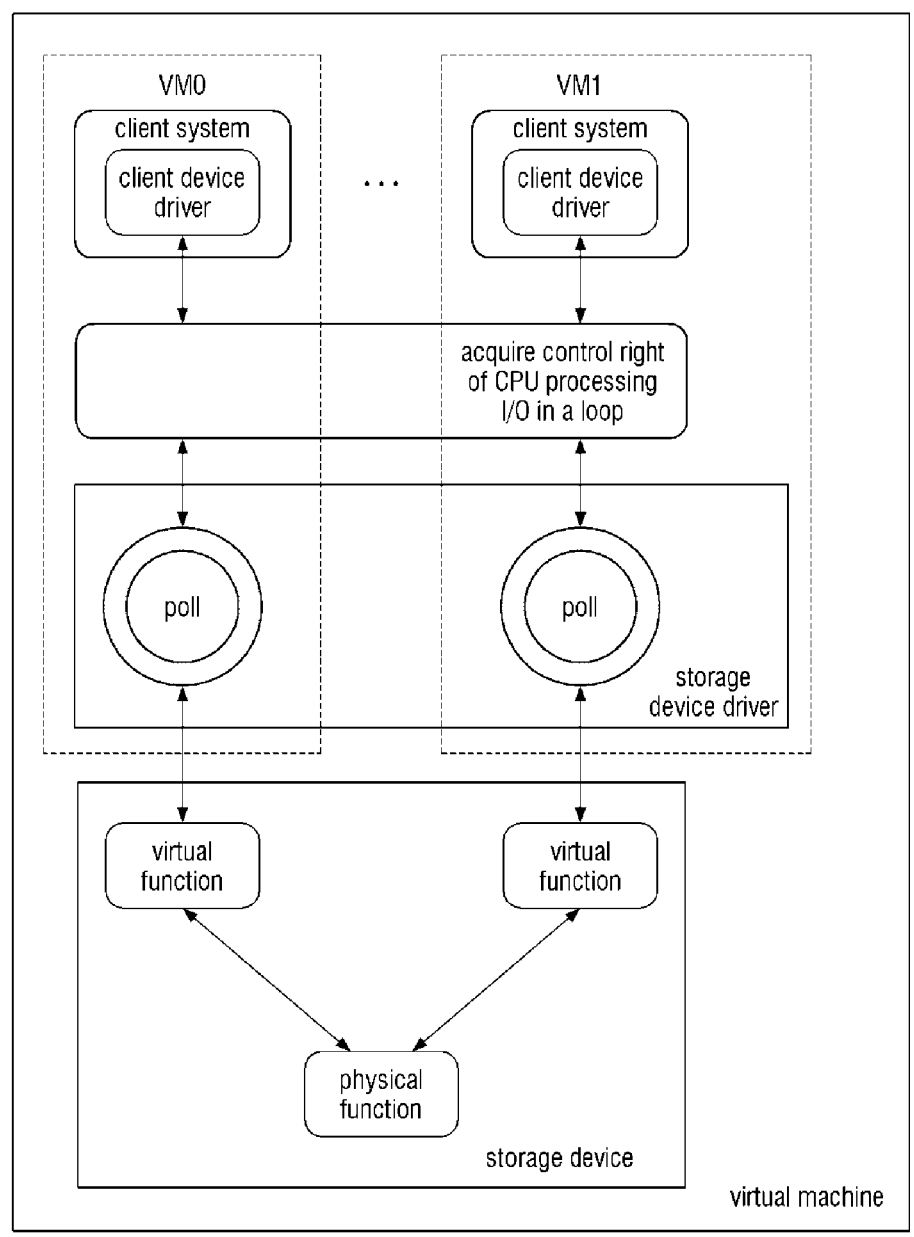
FIG. 10 is a flowchart of a method of establishing a virtual machine according to an exemplary embodiment.

FIG. 9 is a flowchart of a method of establishing a virtual machine according to an exemplary embodiment. FIG. 10 is a flowchart of a method of establishing a virtual machine according to an exemplary embodiment.

Referring to FIG. 9, in step S210, the Pass-Through function and the SR-IOV function of the storage device are enabled. In step S220, multiple VFs of the storage device are created. In step S230, an intermediate layer is created. In step S240, at least one virtual function among the plurality of virtual functions is allocated to the storage virtualization system.

According to an exemplary embodiment of the present disclosure, the intermediate layer may be configured to encapsulate the at least one virtual function as a block capable of accessing the storage device in a polling manner before allocating the at least one virtual function to the storage virtualization system. In order to encapsulate the at least one virtual function as a block capable of accessing the storage device in a polling manner, the intermediate layer may control the control right of a processor of the storage virtualization system so that the processor accesses the storage device in a polling manner. Specifically, on the one hand, the intermediate layer can control the storage device of the storage virtualization system, so that after the storage device completes the processing of the I/O request, the completion information for the I/O request is written into the I/O completion queue, instead of initiating an I/O interrupt signal to the storage virtualization system. On the other hand, the intermediate layer can control the application running on the storage virtualization system, so that the application transmits, after transmitting the I/O request to the virtualization system, the I/O request for the result of the request to the storage virtualization system at predetermined time intervals; determines, in response to the above query request from the application, whether the above completion information exists in the I/O completion queue; and may determine, when the above completion information exists in the I/O completion queue, that the processing of the I/O request is completed, and transmit the result of the I/O request to the application.

The intermediate layer according to the exemplary embodiments of the present disclosure may be implemented using various methods. For example, since the present disclosure is mainly applicable to a virtual machine of a high-speed SSD using the Pass-Through technology and the SR-IOV technology, the storage software currently popular in the industry, that is, the Storage Performance Development Kit (SPDK), can be used to implement the intermediate layers according to exemplary embodiments of the present disclosure. For example, a vhost target provided by SPDK can be used as an intermediate layer to implement polling access by a virtual machine to an SSD (e.g., Non-Volatile Memory Express (NVMe) SSD). Specifically, after enabling the Pass-Through function and SR-IOV function of the SSD, the block device bdev with a back-end of the VF of the NVMe SSD can be added using SPDK, and then a new vhost controller is added to bound the ID of the central processing unit (CPU) core to the above bdev, and finally the virtual machine is started, and the virtual machine is connected to the vhost controller. However, it should be understood that the above operation of implementing the intermediate layer using the SPDK is only an example, and the present disclosure is not limited thereto, for example, various other software may be used to implement the intermediate layer according to exemplary embodiments of the present disclosure.

Therefore, as shown in FIG. 10, according to an exemplary embodiment of the present disclosure, after enabling the Pass-Through function and SR-IOV of the storage device and before assigning the VF to the virtual machine, an intermediate layer is introduced through which the VF is encapsulated into a device block that can access the underlying device (e.g., storage device) in a polling manner, and then the device block is assigned to the virtual machine. In this way, when the virtual machine performs read and write operations, the underlying device can be accessed in the polling manner, thereby avoiding the delay and overhead caused by an interruption operation, so that the performance of the virtual machine when performing random I/O operations is improved.

Figure 11:
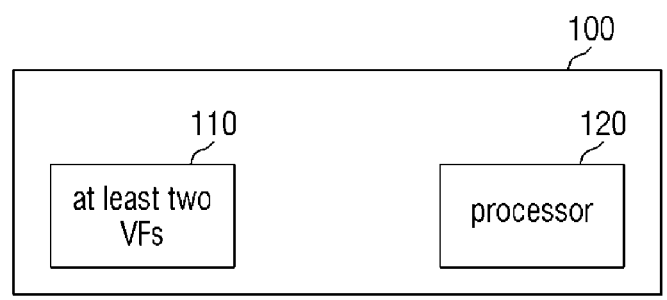
FIG. 11 is a block diagram illustrating a storage device according to an exemplary embodiment.

FIG. 11 is a block diagram illustrating a storage device according to an exemplary embodiment.

Referring to FIG. 11, the virtual device 100 may support SR-IOV. The virtual device 100 may include at least two VFs 110 and a processor 120. The at least two VFs 110 may be configured to process I/O requests and write completion messages for the I/O requests to a completion queue CQ. The controller 120 may be configured to transmit the I/O request to the corresponding VF in response to the I/O request for a corresponding VF by an application; query the CQ queue in a polling manner; and return the completion message to the application if there is the completion message of the I/O request in the CQ.

In one example, the processor may be configured to: query the CQ in the polling manner, after an I/O request control right of the processor is acquired by the virtual machine. In one example, the virtual device may further include a storage device driver configured to control the at least two VFs and the processor. In one example, the I/O request is an I/O read request or an I/O write request. In one example, the virtual machine may control at least two VFs 110 and the processor 120 through the storage device driver of the virtual machine to perform the operations described above.

Since the storage device 100 processes I/O requests in a polling manner, this manner avoids the delay and overhead caused by an interruption, and enables the application to improve I/O efficiency, and finally enables the random parallel read and write performance of the virtual machine using SR-IOV technology to allocate high-speed SSDs to be improved significantly.

Figure 12:
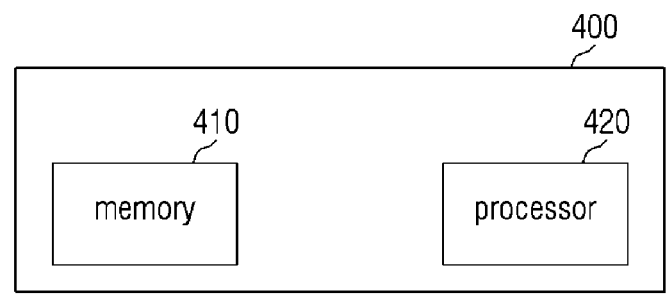
FIG. 12 is a block diagram of an electronic apparatus according to an embodiment of the present invention.

FIG. 12 is a block diagram of an electronic apparatus according to an embodiment of the present invention.

Referring to FIG. 12, the electronic device 400 performing the access method of the storage device according to the embodiment of the present disclosure may be (but not limited to) a programmable logic controller (PLC) industrial computer. The electronic device 400 according to an embodiment of the present disclosure may include a memory 410 and a processor 420. The processor 420 may include (but is not limited to) a central processing unit (CPU), a digital signal processor (DSP), a microcomputer, a field programmable gate array (FPGA), a system on a chip (SoC), a microprocessor, an application specific integrated circuit (ASIC) etc. The memory 410 stores computer programs to be executed by the processor 420. Memory 410 includes high-speed random access memory and/or non-volatile computer-readable storage media. When the processor 420 executes the computer program stored in the memory 410, the control method as described above may be implemented.

Optionally, the control device 400 may communicate with other components in the system in a wired/wireless communication manner, and may also communicate with other devices in the system in a wired/wireless communication manner. In addition, the control device 400 can communicate with devices external to the system in wired/wireless communication. In addition, the control device 400 may have timer and encoder functions.

The access method of the storage device according to an embodiment of the present disclosure may be written as a computer program and stored on a computer-readable storage medium. When the computer program is executed by the processor, the memory access method of the storage virtualization system and the method of creating the storage virtualization system as described above can be implemented. Examples of computer-readable storage media include: read only memory (ROM), random access programmable read only memory (PROM), electrically erasable programmable read only memory (EEPROM), random access memory (RAM), dynamic Random Access Memory (DRAM), Static Random Access Memory (SRAM), Flash, Non-Volatile Memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or Optical Disc storage, Hard Disk Drive (HDD), Solid State Drive (SSD), card memory (such as Multimedia Card, Secure Digital (SD) Card, or Extreme Digital (XD) Card), magnetic tape, floppy disk, magneto-optical data storage device, optical data storage device, hard disk, solid state disk, and any other device, said any other device is configured to store a computer program and any associated data, data files and data structures in a non-transitory manner and to provide said computer program and any associated data, data files and data structures to a processor or computer, such that the processor or computer can execute the computer program. In one example, a computer program and any associated data, data files and data structures are distributed over networked computer systems such that the computer program and any associated data, data files and data structures are stored, accessed, and executed by one or more processors or computers in a distributed manner.

Figure 13:
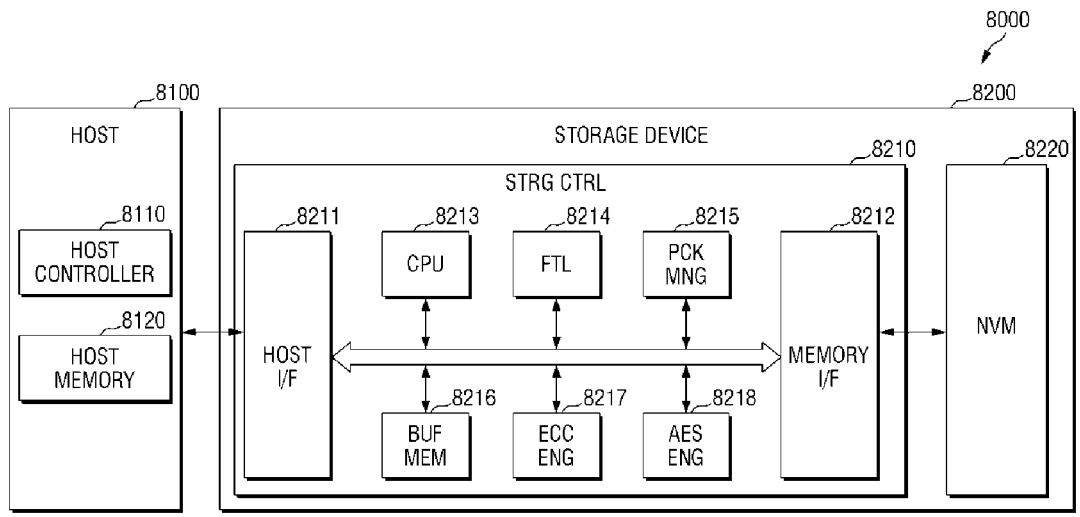
FIG. 13 is a block diagram of a host storage system according to an embodiment of the present invention.

FIG. 13 is a block diagram of a host storage system 8000 according to an exemplary embodiment.

Referring to FIG. 13, the host storage system 8000 may include a host 8100 and a storage device 8200. In addition, the storage device 8200 may include a memory controller 8210 and a NVM 8220. According to an exemplary embodiment of the present invention, the host 8100 may include a host controller 8110 and a host memory 8120. The host memory 8120 may be used as a buffer memory configured to temporarily store data to be transmitted to or received from the storage device 8200.

In some embodiments, the host 8100 may correspond to the storage device driver mentioned in FIGS. 1-5, and the storage device 8200 may correspond to the storage device mentioned in FIGS. 1-5. For example, the host 8100 may be configured to access the storage device 8200 according to the access method of the storage device as described in connection with FIG. 1.

The storage device 8200 may include a storage medium configured to store data in response to a request from the host 8100. As an example, the storage device 8200 may include at least one of an SSD, an embedded memory, and a removable external memory. When the storage device 8200 is an SSD, the storage device 8200 may be an NVMe compliant device. When the storage device 8200 is an embedded memory or an external memory, the storage device 8200 may be a device conforming to the UFS standard or eMMC standard. Both the host 8100 and the storage device 8200 can generate a packet and send the packet according to the adopted standard protocol.

When the NVM 8220 of the storage device 8200 includes a flash memory, the flash memory may include a 2D NAND storage array or a 3D (or vertical) NAND (VNAND) storage array. As another example, the storage device 8200 may include various other kinds of NVMs. For example, the storage device 8200 may include magnetic random access memory (MRAM), spin transfer torque MRAM, conductive bridge RAM (CBRAM), ferroelectric RAM (FRAM), PRAM, RRAM, and various other types of memory.

According to an embodiment, the host controller 8110 and the host memory 8120 may be implemented as separate semiconductor chips. Alternatively, in some embodiments, the host controller 8110 and the host memory 8120 may be integrated in the same semiconductor chip. As an example, the host controller 8110 may be any one of a plurality of modules included in an application processor (AP). The AP can be implemented as a system on chip (SOC). In addition, the host memory 8120 may be an embedded memory included in the AP or a memory module external to the AP.

The host controller 8110 may manage an operation of storing data (e.g., write data) of the buffer area of the host memory 8120 in the NVM 8220 or an operation of storing data (E.G., read data) of the NVM 8220 in the buffer area.

The memory controller 8210 may include a host interface 8211, a memory interface 8212, and a CPU 8213. In addition, the memory controller 8210 may also include a flash conversion layer (FTL) 8124, a packet manager 8215, a buffer memory 8216, an error correction code (ECC) engine 8217, and an advanced encryption standard (AES) engine 8218. The memory controller 8210 may further include a working memory (not shown) in which the FTL 8124 is loaded. The CPU 8213 may execute FTL 8124 to control data write and read operations on the NVM 8220.

The host interface 8211 may send and receive packets to and from the host 8100. The packet sent from the host 8100 to the host interface 8211 may include commands or data to be written to the NVM 8220. The packet sent from the host interface 8211 to the host 8100 may include a response to a command or data read from the NVM 8220. The memory interface 8212 may send data to be written to the NVM 8220 or receive data read from the NVM 8220. The memory interface 8212 may be configured to comply with standard protocols such as toggle or open NAND flash interface (ONFI).

FTL 8124 can perform various functions, such as an address mapping operation, wear balancing operation and garbage collection operation. The address mapping operation can be an operation of converting the logical address received from host 8100 into the physical address used to actually store data in NVM 8220. The wear balancing operation can prevent excessive degradation of specific blocks by allowing uniform use of NVM 8220 blocks Technology. As an example, the wear equalization or balancing operation can be realized by using firmware technology to balance the erase count of physical blocks. The garbage collection operation can be a technology to ensure the available capacity in NVM 8220 by erasing the existing blocks after copying the valid data of the existing blocks to the new blocks.

The packet manager 8215 may generate packets according to a protocol that agrees to the interface of the host 8100, or parse various types of information from packets received from the host 8100. In addition, the buffer memory 8216 may temporarily store data to be written to or read from the NVM 8220. Although the buffer memory 8216 may be a component included in the memory controller 8210, it does not buffer storage, the memory controller 8216 may be external to the memory controller 8210.

ECC engine 8217 can perform error detection and correction operations on the read data read from NVM 8220. More specifically, ECC engine 8217 can generate parity bits for the write data to be written to NVM 8220, and the generated parity bits can be stored in NVM 8220 together with the write data. During reading data from NVM 8220, ECC engine 8217 can use read Data and the parity bit read from NVM 8220 to correct the error in the read data, and output the read data after error correction.

The AES engine 8218 may perform at least one of an encryption operation and a decryption operation on the data input to the memory controller 8210 by using a symmetric key algorithm.

Figure 14:
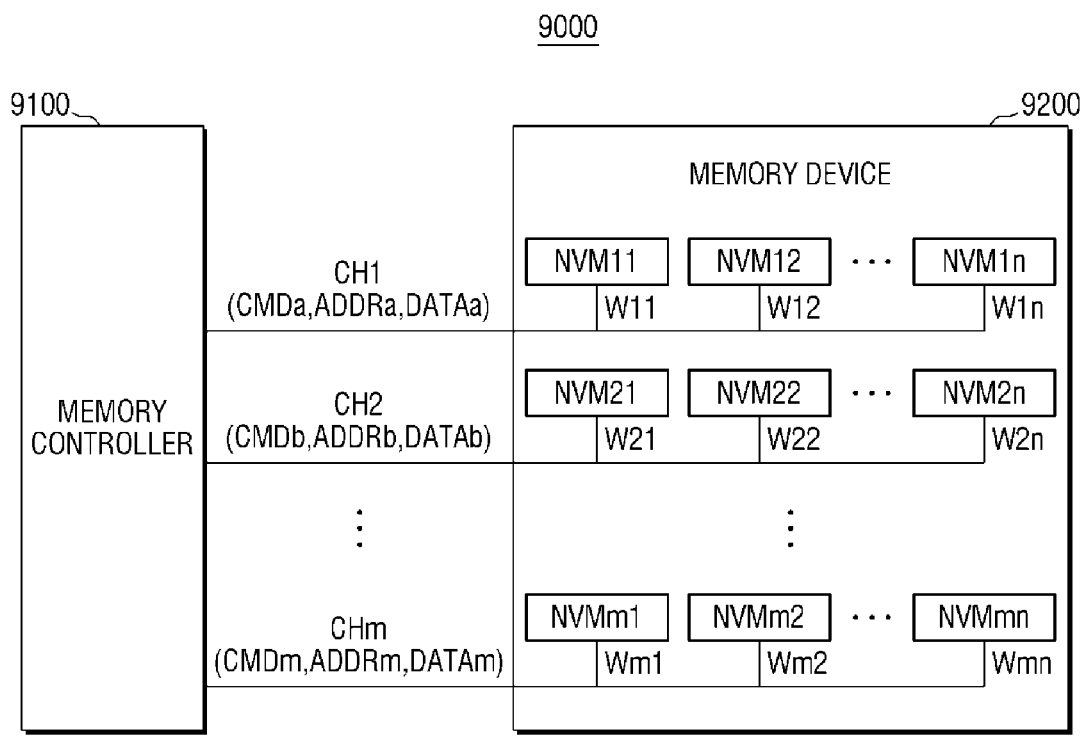
FIG. 14 is a block diagram of a storage system according to an embodiment of the present invention.

FIG. 14 is a block diagram of a storage system 9000 according to an embodiment of the present invention.

Referring to FIG. 14, the storage system 9000 may include a storage device 9200 and a memory controller 9100. The storage system 9000 may support multiple channels CH1 to CHM, and the storage device 9200 may be connected to the memory controller 9100 through the multiple channels CH1 to CHM. For example, storage system 9000 may be implemented as a storage device such as an SSD.

In some embodiments, the storage device 9200 may correspond to the storage device described in FIGS. 1-5, and the memory controller 9100 may correspond to the storage device driver described in FIGS. 1-5. For example, the storage system 9000 may be configured to access and control the storage device 9200 according to the access method of the storage device as described in connection with FIG. 1.

The storage device 9200 may include a plurality of NVM devices NVM11 to NVMmn. Each of the NVM devices NVM11 to NVMmn can be connected to one of the plurality of channels CH1 to CHM through its corresponding path. For example, NVM devices NVM11 to NVM1$n$ may be connected to the first channel CH1 through paths W11 to W1$n$, and NVM devices NVM21 to NVM2$n$ may be connected to the second channel CH2 through paths W21 to W2$n$. In an exemplary embodiment, each of the NVM devices NVM11 to NVM1$n$ may be implemented as any storage element, which may operate according to a separate command from the memory controller 9100. For example, each of the NVM devices NVM11 to NVM1$n$ may be implemented as a chip or die., but the present invention is not limited thereto.

The memory controller 9100 may send and receive signals to and from the storage device 9200 through the plurality of channels CH1 to CHM. For example, the memory controller 9100 may send commands CMDa to CMDm, addresses ADDRa to ADDRm, and data DATAa to DATAm to the storage device 9200 through channels CH1 to CHm, or receive data DATA DATAa to DATAm from the storage device 9200.

The memory controller 9100 may select one from the NVM devices NVM11 to NVMmn connected to each of the channels CH1 to CHM by using the corresponding one of the channels CH1 to CHm, and send and receive signals to and from the selected NVM device. For example, the memory controller 9100 may select the NVM device NVM11 from the NVM devices NVM11 to NVM1$n$ connected to the first channel CH1. The memory controller 9100 can send the command CMDA, address ADDRa and data DATA to the selected NVM device NVM11 through the first channel CH1, or receive data DATA from the selected NVM device NVM11.

The memory controller 9100 may send and receive signals to and from the storage device 9200 in parallel through channels different from each other. For example, the memory controller 9100 may send the command CMDa to the storage device 9200 through the first channel CH1 and the command CMDb to the storage device 9200 through the second channel CH2. For example, the memory controller 9100 may receive data DATAa from the storage device 9200 through the first channel CH1 and data DATAb from the storage device 9200 through the second channel CH2.

The memory controller 9100 may control all operations of the storage device 9200. The memory controller 9100 may send signals to channels CH1 to CHM and control each of the NVM devices NVM11 to NVMmn connected to channels CH1 to CHm. For example, the memory controller 9100 may send a command CMDa and an address ADDRa to the first channel CH1 and control one selected from the NVM devices NVM11 to NVM1$n$.

Each of the NVM devices NVM11 to NVMmn can be operated via the control of the memory controller 9100. For example, the NVM device NVM11 may program the data DATAa based on the command CMDa, the address ADDRa, and the data DATAa provided to the first channel CH1. For example, the NVM device NVM21 may read the data DATAb based on the command CMDB and the address ADDRb provided to the second channel CH2, and send the read data DATAb to the memory controller 9100.

Although FIG. 9 shows an example in which the storage device 9200 communicates with the memory controller 9100 through M channels and includes N NVM devices corresponding to each channel, the number of channels and the number of NVM devices connected to one channel can be changed.

Figure 15:
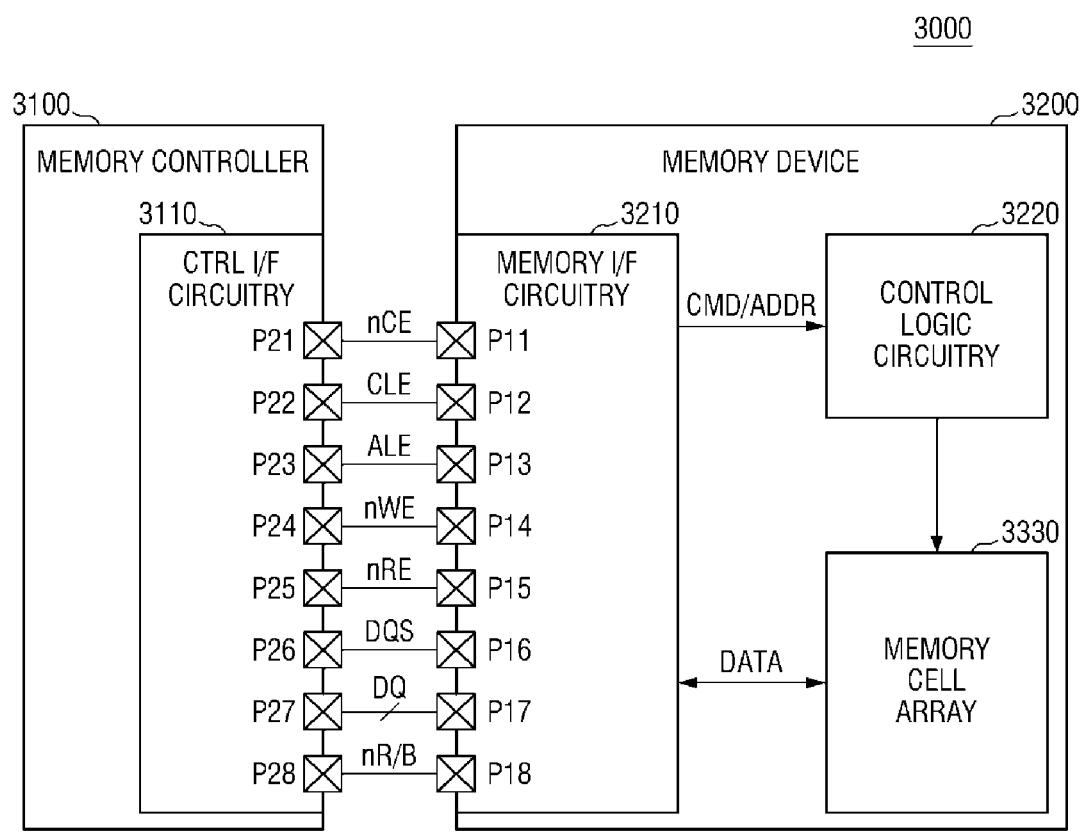
FIG. 15 is a block diagram of a storage system according to an embodiment of the present invention.

FIG. 15 is a block diagram of a storage system 3000 according to an embodiment of the present invention.

Referring to FIG. 15, the storage system 3000 may include a storage device 3200 and a memory controller 3100. The storage device 3200 may correspond to one of the NVM devices NVM11 to NVMmn, which communicates with the memory controller 9100 based on one of the plurality of channels CH1 to CHm of FIG. 9. The memory controller 3100 may correspond to the memory controller 9100 of FIG. 9.

In some embodiments, the storage device 3200 may correspond to the storage device described in FIGS. 1-5, and the memory controller 3100 may correspond to the storage device driver described in FIGS. 1-5. For example, the memory controller 3100 may be configured to access and control the storage device 3200 according to the access method of the storage device as described in connection with FIG. 1.

The storage device 3200 may include first to eighth pins P11 to P18, a memory interface circuit 3210, a control logic circuit 3220, and a storage unit array 3330.

The memory interface circuit 3210 may receive the chip enable signal nCE from the memory controller 3100 through the first pin P11. The memory interface circuit 3210 may send and receive signals to and from the memory controller 3100 through the second to eighth pins P12 to P18 in response to the chip enable signal nCE. For example, when the chip enable signal nCE is in the enable state (E.G., low level), the memory interface circuit 3210 may send a signal to and receive a signal from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. The memory interface circuit 3210 may receive the data signal DQ from the memory controller 3100 through the seventh pin P17 or send the data signal DQ to the memory controller 3100. Command CMD, address ADDR and data can be transmitted via data signal DQ. For example, the data signal DQ may be transmitted through a plurality of data signal lines. In this case, the seventh pin P17 may include a plurality of pins corresponding to a plurality of data signals DQ, respectively.

The memory interface circuit 3210 may obtain the command CMD from the data signal DQ received in the enable interval (E.G., high-level state) of the command latch enable signal CLE based on the switching time point of the write enable signal nWE. The memory interface circuit 3210 may obtain the address ADDR from the data signal DQ received in the enable interval (E.G., high-level state) of the address latch enable signal ALE based on the switching time point of the write enable signal nWE.

In an exemplary embodiment, the write enable signal nWE may remain static (E.G., high level or low level) and switch between high level and low level. For example, the write enable signal nWE can be switched in the interval where the command CMD or address ADDR is sent. Therefore, the memory interface circuit 3210 can obtain the command CMD or address ADDR based on the switching time point of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 through the sixth pin P16, or may send the data strobe signal DQS to the memory controller 3100.

In the data (DATA) output operation of the storage device 3200, the memory interface circuit 3210 may receive the read enable signal nRE switched by the fifth pin P15 before outputting the data DATA. The memory interface circuit 3210 may generate a data strobe signal DQS, which is switched based on the switching of the read enable signal nRE. For example, the memory interface circuit 3210 may generate a data strobe signal DQS based on the switching start time of the read enable signal nRE, which starts switching after a predetermined delay (E.G., tDQSRE). The memory interface circuit 3210 may transmit a data signal DQ including data DATA based on the switching time point of the data strobe signal DQS. Therefore, the data DATA can be aligned with the switching time point of the data strobe signal DQS and transmitted to the memory controller 3100.

In the data (DATA) input operation of the storage device 3200, when the data signal DQ including data DATA is received from the memory controller 3100, the memory interface circuit 3210 may receive the switched data strobe signal DQ and data DATA. The memory interface circuit 3210 may obtain data DATA from the data signal DQ based on the switching time point of the data strobe signal DQS. For example, the memory interface circuit 3210 may sample the data signal DQ at the rising and falling edges of the data strobe signal DQS and obtain data DATA.

The memory interface circuit 3210 can send the ready/busy output signal nR/B to the memory controller 3100 through the eighth pin P18. The memory interface circuit 3210 may transmit the status information of the storage device 3200 to the memory controller 3100 through the ready/busy output signal nR/B. When the storage device 3200 is in a busy state (i.e., when an operation is being performed in the storage device 3200), the memory interface circuit 3210 may send a ready/busy output signal nR/B indicating the busy state to the memory controller 3100. When the storage device 3200 is in the ready state (i.e., when no operation is performed or completed in the storage device 3200), the memory interface circuit 3210 may send the ready/busy output signal nR/B indicating the ready state to the memory controller 3100. For example, when the storage device 3200 reads data from the storage unit array 3330 in response to a page reading command, the memory interface circuit 3210 may send a ready/busy output signal nR/B indicating a busy state (E.G., low level) to the memory controller 3100. For example, when the storage device 3200 programs the data DATA to the storage unit array 3330 in response to the programming command, the memory interface circuit 3210 may send the ready/busy output signal nR/B indicating the busy state to the memory controller 3100.

The control logic 3220 may control all operations of the storage device 3200. The control logic circuit 3220 may receive a command/address CMD/ADDR obtained from the memory interface circuit 3210. The control logic 3220 may generate control signals for controlling other components of the storage device 3200 in response to the received command/address CMD/ADDR. For example, the control logic circuit 3220 may generate various control signals for programming data DATA to or reading data DATA from the storage unit array 3330.

The storage unit array 3330 may store the data DATA obtained from the memory interface circuit 3210 via the control of the control logic circuit 3220. The storage unit array 3330 may output the stored data DATA to the memory interface circuit 3210 via the control of the control logic circuit 3220.

The storage unit array 3330 may include a plurality of storage units. For example, a plurality of storage units may be flash memory units. However, the present invention is not limited to this, and the storage unit may be an RRAM unit, a FRAM unit, a PRAM unit, a thyristor RAM (TRAM) unit or an MRAM unit. Hereinafter, an embodiment in which the storage unit is a NAND flash memory unit will be mainly described.

The memory controller 3100 may include first to eighth pins P21 to P28 and a controller interface circuit 3110. The first to eighth pins P21 to P28 may correspond to the first to eighth pins P11 to P18 of the storage device 3200, respectively.

The controller interface circuit 3110 may send the chip enable signal nCE to the storage device 3200 through the first pin P21. The controller interface circuit 3110 may send a signal to and receive a signal from the storage device 3200 through the second to eighth pins P22 to P28, wherein the storage device 3200 is selected by the chip enable signal nCE.

The controller interface circuit 3110 may send the command latch enable signal CLE, the address latch enable signal ALE and the write enable signal nWE to the storage device 3200 through the second to fourth pins P22 to P24. The controller interface circuit 3110 may send or receive the data signal DQ to or from the storage device 3200 through the seventh pin P27.

The controller interface circuit 3110 may transmit the data signal DQ including the command CMD or address ADDR and the switched write enable signal nWE to the storage device 3200. The controller interface circuit 3110 may transmit the data signal DQ including the command CMD to the storage device 3200 by transmitting the command latch enable signal CLE with the enable state. Moreover, the controller interface circuit 3110 may transmit the data signal DQ including the command CMD to the storage device 3200 through an address latch enable signal ALE having an enable state that is transmitted to transmit a data signal DQ including an address ADDR to the storage device 3200.

The controller interface circuit 3110 may send the read enable signal nRE to the storage device 3200 through the fifth pin P25. The controller interface circuit 3110 may receive the data strobe signal DQS from the storage device 3200 or send the data strobe communication signal DQS to the storage device 3200 through the sixth pin P26.

In the data (DATA) output operation of the storage device 3200, the controller interface circuit 3110 may generate a switched read enable signal nRE and send the read enable signal nRE to the storage device 3200. For example, before outputting the data DATA, the controller interface circuit 3110 may generate a read enable signal nRE from a static state (e.g., high level or low level) Therefore, the storage device 3200 can generate the switched data strobe signal DQS based on the read enable signal nRE. The controller interface circuit 3110 can receive the data signal DQ including data DATA and the switched data strobe signal DQS from the storage device 3200. The controller interface circuit 3110 can obtain data DATA from the data signal DQ based on the switching time point of the data strobe signal DQS.

During the data (DATA) input operation of the storage device 3200, the controller interface circuit 3110 may generate a switched data strobe signal DQS. For example, before transmitting the data DATA, the controller interface circuit 3110 may generate a data strobe signal DQS from a static state (E.G., high level or low level), which may transmit the data signal DQ including the data DATA to the storage device 3200 based on the switching time point of the data strobe signal DQS.

The controller interface circuit 3110 may receive the ready/busy output signal NR/B from the storage device 3200 through the eighth pin P28. The controller interface circuit 3110 may determine the status information of the storage device 3200 based on the ready/busy output signal nR/B.

Figure 16:
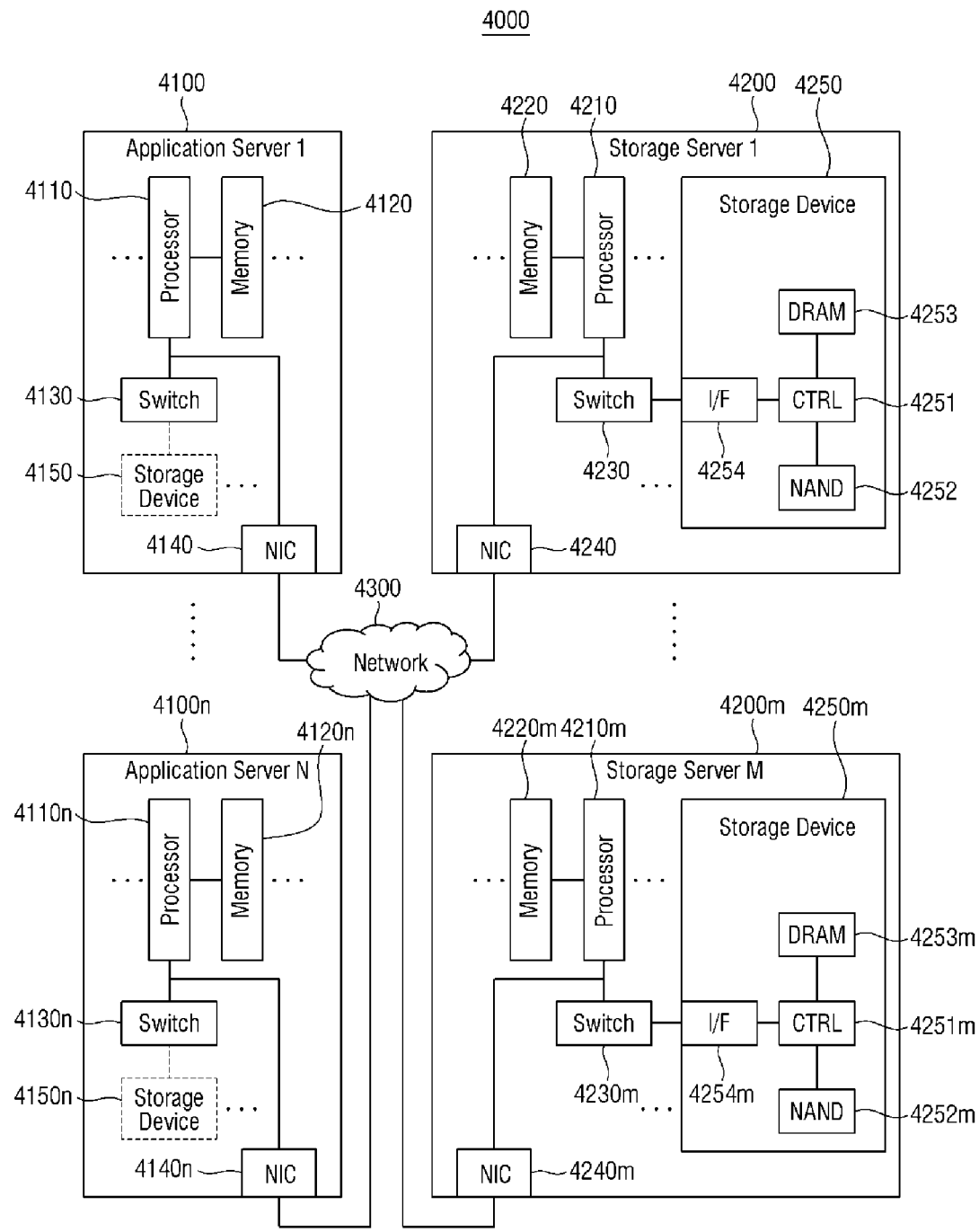
FIG. 16 is a block diagram of a data center to which a storage device is applied according to an embodiment of the present invention.

FIG. 16 is a block diagram of a data center 4000 to which a storage device is applied according to an embodiment of the present invention.

Referring to FIG. 16, the data center 4000 may be a facility for collecting various types of data and providing services, and is referred to as a data storage center.

The data center 4000 may be a system for operating search engines and databases, and may be a computing system used by companies (such as banks) or government agencies. The data center 4000 may include application servers 4100 to 4100n and storage servers 4200 to 4200m. According to an embodiment, the number of applications 4100 to 4100n and the number of storage servers 4200 to 4200m can be selected differently. The number of application servers 4100 to 4100n and the number of storage servers 4200 to 4200m may be different from each other.

In some embodiments, one or more of the application servers 4100 to 4100n may correspond to the storage device driver described in FIGS. 1-5, and one or more of the storage servers 4200 to 4200m may correspond to the storage device described in FIGS. 1-5. For example, one or more of the application servers 4100 to 4100n may be configured to access and control one or more of the storage servers 4200 to 4200m according to the access method of the storage device as described in FIG. 1.

The application server 4100 or the storage server 4200 may include processors 4110 and 4210 and at least one of memories 4120 and 4220. The storage server 4200 will now be described as an example. The processor 4210 may control all operations of the storage server 4200, access the memory 4220, and execute instructions and/or data loaded into the memory 4220. The memory 4220 may be a dual data rate synchronous DRAM (DDR SDRAM), a high bandwidth memory (HBM), a hybrid memory cube (HMC), a dual in-line memory module (DIMM), an otane DIMM, or a nonvolatile DIMM (NVMDIMM). In some embodiments, the number of processors 4210 and memory 4220 included in the storage server 4200 may be selected differently. In one embodiment, processor 4210 and memory 4220 may provide a processor-memory pair. In another embodiment, the number of processors 4210 and the number of memories 4220 may be different from each other. The processor 4210 may include a single core processor or a multi-core processor. The above description of the storage server 4200 can be similarly applied to the application server 4100. In some embodiments, the application server 4100 may not include a storage device 4150. The storage server 4200 may include at least one storage device 4250. According to an embodiment, the number of storage devices 4250 included in the storage server 4200 may be selected differently.

Application servers 4100 to 4100n can communicate with storage servers 4200 to 4200m through network 4300. The network 4300 may be implemented by using fiber channel (FC) or Ethernet. In this case, FC can be a medium for relatively high-speed data transmission, and optical switches with high performance and high availability can be used. According to the access method of the network 4300, the storage servers 4200 to 4200m can be set as file storage, block storage or object storage.

In one embodiment, the network 4300 may be a network dedicated to storage, such as a storage area network (SAN). For example, a San can be a FC-SAN that uses an FC network and is implemented according to the FC protocol (FCP). As another example, the San may be an Internet Protocol (IP)-SAN, which uses a transmission control protocol (TCP)/IP network and is implemented according to SCSI over TCP/IP or Internet SCSI (iSCSI) protocol. In another embodiment, the network 4300 may be a general-purpose network, such as a TCP/IP network. For example, the network 4300 may be implemented according to protocols such as FC (FCoE) over Ethernet, network attached storage (NAS), and fabric nvme (NVMe-of).

Hereinafter, the application server 4100 and the storage server 4200 will be mainly described. The description of the application server 4100 may be applied to another application server 4100$n$, and the description of the storage server 4200 may be applied to another storage server 4200$m$.

The application server 4100 may store the data requested to be stored by the user or the client in one of the storage servers 4200 to 4200$m$ through the network 4300. In addition, the application server 4100 can obtain data requested to be read by a user or a client from one of the storage servers 4200 to 4200$m$ through the network 4300. For example, the application server 4100 may be implemented as a network server or a database management system (DBMS).

The application server 4100 may access the memory 4120$n$ or the storage device 4150$n$ included in another application server 4100$n$ through the network 4300. Alternatively, the application server 4100 may access the memories 4220 to 4220$m$ or storage devices 4250 to 4250$m$ included in the storage servers 4200 to 4200$m$ through the network 4300. Therefore, the application server 4100 may perform various operations on the data stored in the application servers 4100 to 4100$n$ and/or the storage servers 4200 to 4200$m$. For example, the application server 4100 may execute instructions for moving or copying data between the application servers 4100 to 4100$n$ and/or the storage servers 4200 to 4200$m$. In this case, data may be moved from the storage devices 4250 to 4250$m$ of the storage servers 4200 to 4200$m$ through the memories 4220 to 4220$m$ of the storage servers 4200 to 4200$m$ or directly to the memories 4120 to 4120$n$ of the application servers 4100 to 4100$n$. The data moved through the network 4300 may be data encrypted for security or privacy.

The storage server 4200 will now be described as an example. The interface 4254 may provide a physical connection between the processor 4210 and the controller 4251 and a physical connection between the network interface card (NIC) 4240 and the controller 4251. For example, the interface 4254 may be implemented using a direct attached storage (DAS) scheme, where the storage device 4250 is directly connected to a dedicated cable. For example, interface 4254 can be implemented by using various interface schemes, such as ATA, SATA, E-SATA, SCSI, SAS, PCI, PCI.e., nvme, IEEE 1394, USB interface, SD card interface, MMC interface, eMMC interface, UFS interface, eUFS interface and CF card interface.

The storage server 4200 may further include a switch 4230 and a network interconnect (NIC) 4240. The switch 4230 may selectively connect the processor 4210 to the storage device 4250 via the control of the processor 4210, or selectively connect the NIC 4240 to the storage device 4250.

In one embodiment, NIC 4240 may include a network interface card and a network adapter. NIC 4240 can be connected to network 4300 through wired interface, wireless interface, Bluetooth interface or optical interface. The NIC 4240 may include an internal memory, a digital signal processor (DSP), and a host bus interface, and is connected to the processor 4210 and/or the switch 4230 through the host bus interface. The host bus interface may be implemented as one of the above examples of interface 4254. In one embodiment, NIC 4240 may be integrated with at least one of processor 4210, switch 4230, and storage device 4250.

In storage servers 4200 to 4200$m$ or application servers 4100 to 4100$n$, the processor may send commands to storage devices 4150 to 4150$n$ and 4250 to 4250$m$ or memories 4120 to 4120$n$ and 4220 to 4220$m$ and program or read data. In this case, the data can be the wrong data corrected by the ECC engine. The data may be data on which a data bus inversion (DBI) operation or a data masking (DM) operation is performed, and may include cyclic redundancy coding (CRC) information. Data can be encrypted for security or privacy.

The storage devices 4150 to 4150$n$ and 4250 to 4250$m$ may send control signals and command/address signals to the NAND flash memory devices 4252 to 4252$m$ in response to a read command received from the processor. Therefore, when reading data from the NAND flash memory devices 4252 to 4252$m$, the read enable (RE) signal can be input as the data output control signal. Therefore, the data can be output to the DQ bus. The RE signal can be used to generate the data strobe signal DQS. Depending on the rising or falling edge of the write enable (WE) signal, the command and address signals can be locked in the page buffer.

The controller 4251 may control all operations of the storage device 4250. In one embodiment, the controller 4251 may include a SRAM. The controller 4251 may write data to the NAND flash memory device 4252 in response to a write command or read data from the NAND flash memory device 4252 in response to a read command. For example, write commands and/or read commands may be provided from processor 4210 of storage server 4200, processor 4210$m$ of another storage server 4200$m$, or processors 4110 and 4110$n$ of application servers 4100 and 4100$n$. The DRAM 3253 may temporarily store (or buffer) data to be written to or read from the NAND flash memory device 4252. Also, DRAM 3253 can store metadata. Here, the metadata may be user data or data generated by the controller 4251 for managing the NAND flash memory device 4252. The storage device 4250 may include a security element (SE) for security or privacy.

In the present disclosure, since the storage virtualization system processes I/O requests in a polling manner, this manner avoids the delay and overhead caused by the interruption, and enables the application to improve I/O efficiency, and finally it enables the random parallel read and write performance of the virtual machine using SR-IOV technology to allocate high-speed SSDs to be improved significantly.

While the present invention has been particularly shown and described with reference to exemplary embodiments thereof, it will be understood by those skilled in the art that various changes in form and details may be made therein without departing from the spirit and scope of the present invention defined by the appended claims.

What is claimed is:

1. An access method of a storage device, the storage device supporting a single root input output virtualization (SR-IOV), the storage device is virtualized as at least two virtual functions (VFs), the access method comprising:
    receiving, by a virtual machine and from an application, an input/output (I/O) request for the storage device;
    based on the virtual machine receiving the I/O request, transmitting, by the virtual machine, the I/O request to a corresponding VF;
    writing, by the corresponding VE a completion message of the I/O request to a completion queue (CQ);

querying, by a virtual processor of the virtual machine, the CQ in a polling manner;

detecting, by the virtual processor and based on polling the CQ, the completion message of the I/O request in the CQ; and returning, based on detection of the completion message of the I/O request in the CQ, the completion message to the application, wherein querying the CQ in the polling manner comprises, after an I/O request control right of the virtual processor is acquired by the virtual machine, querying, by the virtual processor, the CQ in the polling manner.

2. The access method according to claim 1, wherein the virtual machine executes the access method through a storage device driver of the virtual machine.

3. The access method according to claim 1, wherein the I/O request is an I/O read request or an I/O write request.

4. A virtual device, the virtual device supporting a single root input output virtualization (SR-IOV), the virtual device comprising:

at least two virtual functions (VFs) configured to process an input/output (I/O) request and to write a completion message of the I/O request to a completion queue (CQ); and a physical processor coupled to memory and configured to:

transmit the I/O request to a corresponding VF of the at least two VFs;

query the CQ in a polling manner; and detect a completion message related to the I/O request in the CQ;

return, based on detection of the completion message related to the I/O request in the CQ, the completion message to an application, wherein querying the CQ in the polling manner comprises, after an I/O request control right of a virtual processor is acquired by the virtual device querying, by the virtual processor, the CQ in the polling manner.

5. The virtual device according to claim 4, wherein the physical processor is configured to: after an I/O request control right of the physical processor is acquired by the virtual device, query the CQ in the polling manner.

6. The virtual device according to claim 4, wherein the virtual device further comprises:

a storage device driver configured to control the at least two VFs and the physical processor.

7. The virtual device according to claim 4, wherein the I/O request is an I/O read request or an I/O write request.

8. A storage system, comprising:

a storage device configured to support a single root input output virtualization (SR-IOV) and be virtualized as at least two virtual functions (VFs); and a memory controller configured to access the storage device according to the access method of the storage device of claim 1.

9. The storage system according to claim 8, wherein querying the CQ in a polling manner comprises:

after an I/O request control right of the virtual processor is acquired by the virtual machine, querying, by the virtual processor, the CQ in the polling manner.

10. The storage system according to claim 8, wherein the virtual machine executes the access method through a storage device driver of the virtual machine.

11. The storage system according to claim 8, wherein the I/O request is an I/O read request or an I/O write request.

* * * * *